358-86. OR 3,860,748 SR

United States Patent [19]

Everhart et al.

[11] 3,860,748

[45] Jan. 14, 1975

[54] CATV PRIMARY AND AUXILIARY POWER DISTRIBUTION APPARATUS

[75] Inventors: Norman Everhart, Richboro; James Herman, Hatboro; William Meise, Southampton, all of Pa.

[73] Assignee: Jerrold Electronics Corp., Horsham, Pa.

[22] Filed: June 20, 1973

[21] Appl. No.: 371,596

[52] U.S. Cl......... 178/6, 178/DIG. 11, 178/DIG. 13, 340/248 A, 340/248 B, 340/248 C, 179/170 R

[51] Int. Cl............................................. H04h 7/12

[58] Field of Search.......... 178/DIG. 11, DIG. 13, 6; 325/308, 492; 179/170; 340/248 A, 248 B, 248 C, 253 C

[56] References Cited

UNITED STATES PATENTS 2,003,967 6/1935 Green ............................ 179/170 J

*Primary Examiner*—Benedict V. Safourek
*Assistant Examiner*—Edward L. Coles
*Attorney, Agent, or Firm*—John M. Calimafde

[57] ABSTRACT

A power distribution arrangement for CATV or like applications includes power supply apparatus for quiescently supplying line amplifier powering 60 Hz line potential to system cabling. Standby batteries, an inverter, and power loss sensing switching apparatus is provided to automatically supply energy at a power rate other than 60 Hz (e.g., 70 Hz) when line voltage is lost.

Power frequency sensing and switching circuitry is included at trunk repeater stations which responds to power at the standby, non-60Hz rate by operatively removing power from feeder lines, bridging amplifiers and the like. This reduces battery power drain, thereby extending the continued ability of the main trunk amplifiers to proliferate video throughout the cable system.

8 Claims, 2 Drawing Figures

CATV PRIMARY AND AUXILIARY POWER DISTRIBUTION APPARATUS

DISCLOSURE OF INVENTION

Figure 1:
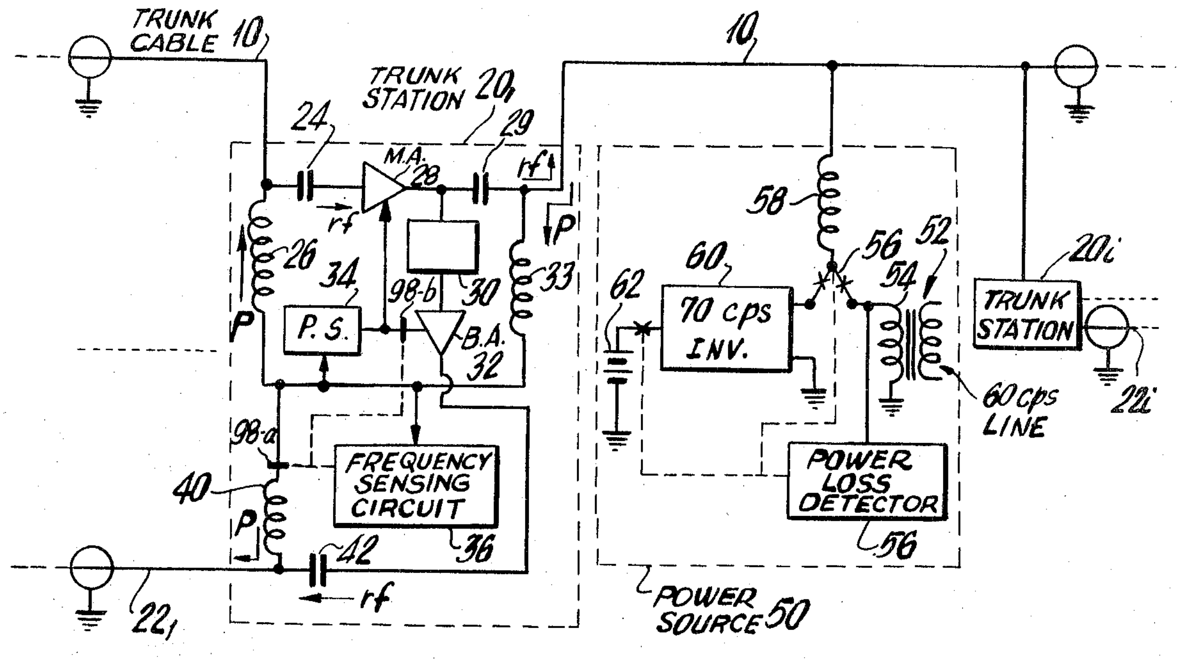

This invention relates to electronic cable communications systems and, more specifically, to improved structure for providing both primary and auxiliary power for such systems.

In cable community antenna television (CATV) systems, video information is transmitted from a system head end to spaced subscriber stations via coaxial cable. The cable network topography typically comprises a main trunk cable, and various hierarchies of feeder lines and the like, leading to final drop lines into individual subscriber locations. Taps are provided to distribute radio frequency energy from the trunk line throughout the CATV system network.

System cabling, both trunk and feeder lines, in general traverses substantial distances and requires spaced signal regenerators i.e., repeater line amplifiers, to compensate for line losses and maintain the cable signal level substantially constant. Moreover, bridging amplifiers are typically employed to drive feeder lines and signals derived via high grade taps from the trunk cable.

The cable amplifiers are powered via conventional 60 Hz potential (at reduced amplitudes) which propagates along the cable network, and which is periodically regenerated, as by spaced regulating (e.g., ferroresonant) transformers. Transformed AC line voltage may propagate in either direction vis-a-vis the r.f. signal direction through any amplifier and may pass in either direction between trunk and feeder line ports at any trunk station. Alternatively, a separate power cable has sometimes been employed as an amplifier-powering source.

One desideratum of CATV system operators is to reduce the disruptive effects of local power losses on the overall cable network. Obviously, all subscribers dependent for signal on any trunk amplifier without power have a total communications loss.

Accordingly, to somewhat ameliorate the effects of power loss, batteries have been utilized as a backup power source. When loss of AC line voltage is sensed, the batteries are connected to an inverter which reproduces the AC line potential (at its transformed, reduced amplitude). One difficulty with this arrangement, however, is the limited capability of the standby batteries which quickly drain below operative levels when energizing all line equipment, i.e., line and bridging amplifiers in trunk and all subsidiary cable lines.

It is thus an object of the present invention to provide improved power distribution apparatus for CATV systems.

More specifically, it is an object of the present invention to provide a CATV auxiliary power distribution arrangement which, when enabled, energizes only certain (i.e., trunk station) system amplifiers, and which is therefore operable over an extended period of time.

The above and other objects of the present invention are realized in a specific, illustrative CATV power distribution system wherein system power sources normally supply nominal 60 Hz AC line parallel for cable distribution. The power sources further include standby batteries, an inverter and power loss sensing switching apparatus for supplying AC potential at a power frequency different than 60 Hz (e.g., 70 Hz) when line voltage is lost.

The trunk stations include power frequency sensing circuitry which responds to incoming energy at the standby power signalling 70 Hz rate by blocking the power feeding paths to feeder cable lines emanating therefrom, and also to the bridging amplifiers. This substantially reduces battery power drain and extends battery life, while assuring continuous operation of main line amplifiers such that video is distributed about the trunk cable topography.

Referring now to FIG. 1, there is shown an illustrative community antenna television (CATV) system comprising a main, trunk coaxial cable 10 for communicating video information from a system head end (not shown) to variously located plural system subscribers. The trunk 10 includes at various spaced position trunk stations $\mathbf{20}_i$ which, among other functions, amplify the radio frequency video signals propagated by the cable 10 to compensate for video attenuation effected by the cable length between amplifiers. Two such stations $\mathbf{20}_i$ and $\mathbf{20}_i$ are shown in the drawing. Also connected to the cable 10 is a power source 50 for supplying alternating current potential to the line for providing power to the various line amplifiers.

Included in the network topography of a typical CATV system are a plurality of feeder line coaxial cables $\mathbf{22}_i$ which receive a measure of the radio frequency energy on the trunk cable 10 and which distribute the video information to subscribers in a localized geographical area, i.e., a street or several streets, via subscriber drop lines and signal splitters. The feeder lines will also typically include amplifiers to compensate for signal attenuation, these amplifiers similarly requiring alternating current potential for amplifier energization.

Examining first the power source 50 of the present invention, during normally operative periods the nominal 117 VAC 60 Hz AC line potential is supplied to the primary of a voltage reducing transformer 52, as of the regulating type. The secondary 54 of the transformer is quiescently connected through the normally closed contacts of a relay 56 to the cable 10 via an inductor 58. The high r.f. impedance of the inductor 58 thus characterizes the composite source 50 as a very low drain to radio frequency video information propagating on the cable 10.

Connected to the transformer secondary winding 54 is a power loss detector circuit 56 (e.g., a simple peak detector preferably tuned to 60 Hz) for energizing the relay 56 such that the lower end of the inductor 58 is connected to the transformer secondary 54 to receive 60 Hz line energy during normal periods when there is no loss of line potential, and to connect the coil 58 to the output of an inverter 60, more fully characterized below, when AC line power is interrupted for any reason. Accordingly, during such times as the AC line energy is present—which is the normal state of affairs—the source 50 supplies power at the conventional 60 cycle per second rate in both directions along the cable 10. It will be appreciated that plural, spaced power sources 50 will normally be located along the length of the trunk cable 10.

Considering now conventional trunk station 20, e.g., the station $\mathbf{20}_i$ shown in detail in FIG. 1, radio frequency energy on the trunk cable 10 (assumed to propagate from left to right in FIG. 1) is extracted at the cable 10 input port from the cable via a capacitor 24 of relatively low value. The capacitor 24 appears as an extremely low impedance to the high frequency video information (at least tens of megacycles) and as a very high impedance at power frequency. The radio frequency signal is amplified by a main amplifier 28 and passes out to the next length of trunk cable 10 via an output capacitor 29. Some stations 20, such as the illustrative trunk line composite amplifier $20_i$ shown in FIG. 1 also employs a bridging amplifier 32 which extracts a measure of the signal on the trunk cable (as via a high grade splitter or tap 30), and drives a feeder line $22_i$ via a radio frequency passing capacitor 42. Other trunk stations 20 may simply regenerate the propagating video signal without requirement for driving feeder lines and thus without any requirement for the splitter 30 or bridging amplifier 32.

A power supply 34 in the station $20_i$ receives the AC line potential on the cable 10 via a radio frequency blocking, power frequency passing inductor 33; converts this AC energy to a DC potential; and energizes the main amplifier 28 with this output voltage. The power supply 34 normally also energizes with its output direct potential the bridging amplifier 32 via normally closed relay contacts 98-*b*.

The 60 cycle potential received by the station $20_i$ through inductor 33 passes out of an inductor 26 to the trunk cable 10 for energizing trunk stations 20 cascaded further up the cable, i.e., to the left in FIG. 1. Moreover, the AC line potential received by the trunk station $20_i$ normally also passes through normally closed contacts 98-*a* and passes via a radio frequency blocking inductor 40 to the feeder line $22_i$ for energizing repeater amplifiers cascaded along that line. The normally closed relay contacts 98-*a*, *b* are controlled by a frequency sensing circuit 36 which maintains the contacts in their quiescently closed state so long as the incoming power to the trunk station is of its nominal 60 cycle per second rate.

Thus, assuming no interruption of the 60 cycle power line at power source 50, the AC line energy propagates along all trunk and feeder lines powering all line amplifiers, extenders, and the like with no loss in service for any subscriber.

Consider now the case when power is interrupted for any reason. When this occurs, the power loss detector 56 closes the normally open contacts of the relay 56, thereby connecting a standby battery 62 at the power source 50 to the input of a DC-to-AC converter, e.g., an inverter 60 of any standard configuration. The inverter 60 is adapted to produce an output sinusoid of a frequency in the power range (i.e., which is not attenuated by system power transformers), but which differs from the normal 60 Hz value, e.g., 70 Hz. Thus, when line voltage is lost for any reason, the battery 62 is automatically connected into an operative state and supplies a 70 Hz signal to the main trunk cable 10 via the inductor 58.

In a manner identical to that described above with respect to the normal 60 Hz AC power, the 70 Hz energy propagates along the main trunk cable 10, and is connected to the power supply 34 in all trunk stations 20 to energize the trunk station main amplifiers 28. Accordingly, video is maintained along the entire length of the trunk cable. In those areas not affected by power service interruption, the feeder line amplifiers are operative via the local 60 Hz power sources there obtaining and video service is developed in normal fashion.

However, the frequency sensing circuit 36 in a trunk station 20 receiving incoming 70 Hz vis-a-vis 60 Hz energy notes the incoming frequency and opens the normally closed relay contacts 98-*a* and 98-*b*. This removes DC power from the bridging amplifier 32 in the trunk station, and also removes outgoing AC energy from all feeder lines 22 (and there may be more than one) emanating therefrom. Thus, energy is withdrawn from the battery 62 only to power the indispensable trunk main amplifier 28, thus insuring that the critical trunk cable 10 distributes radio frequency video along its entire length for the greatest possible time. Thus, a power interruption, even near the head end, will not as a general matter interrupt video at great distances down the trunk cable 10 removed from the head end where power may still be locally available for providing feeder line service.

Figure 2:
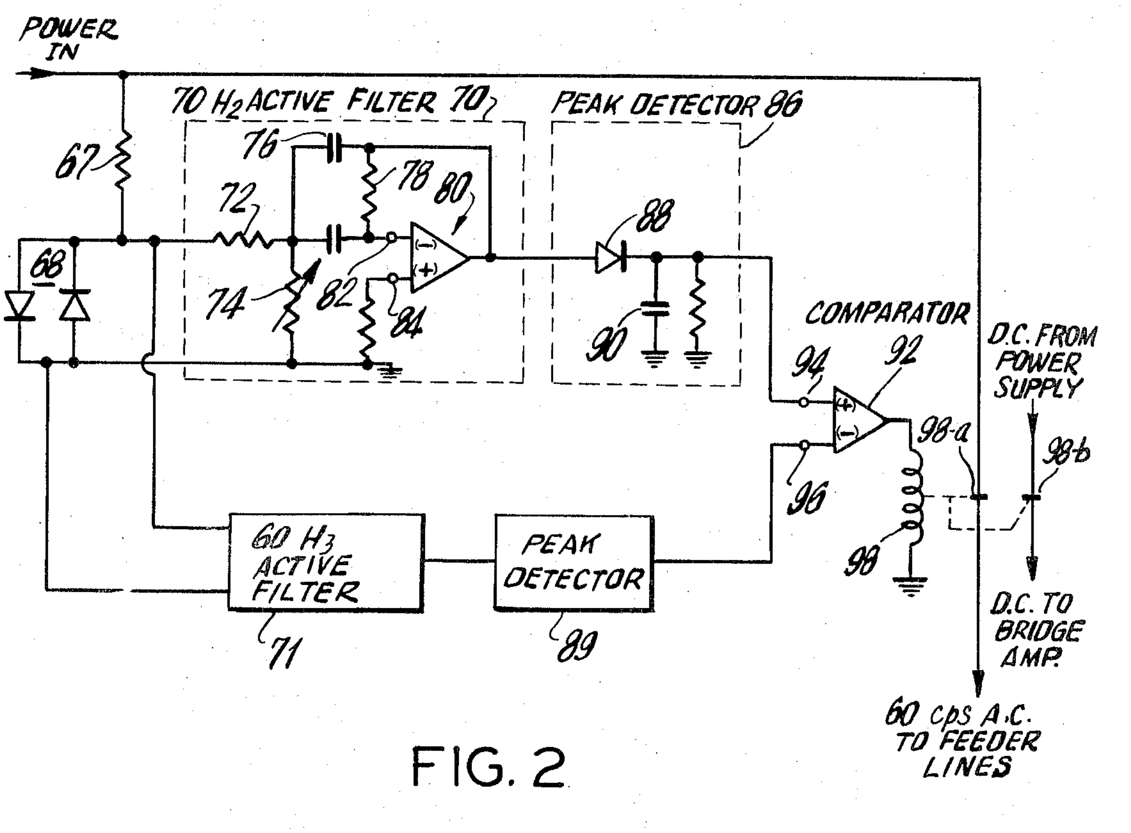

Referring now to FIG. 2, there is shown particular, illustrative implementation for the frequency sensing circuit 36 shown for the illustrative trunk station $20_i$ in FIG. 1. Incoming power (received via the inductor 33 in FIG. 1) propagates via an isolation resistor 67 to two oppositely polled, shunt-connected diodes 68 which thus develop thereacross an alternating potential of about 1.4 volts peak to peak at the power frequency. This AC signal is supplied to two band-pass filters 70 and 71 (e.g., of an active construction for small component size at power frequencies), the filter 70 being tuned to 70 Hz and the filter 71 being tuned to 60 Hz. An illustrative active band-pass filter well known per se to those skilled in the art is shown in FIG. 2, and comprises an operational amplifier 80 having a passive network connected between the amplifier input and output ports as shown, frequency being tuned by an adjustment of a resistor 74.

The outputs of each of the active filters 70 and 71 are supplied to peak detectors 86 and 89, respectively, the peak detectors 86 and 89 providing signals of like (e.g., positive) polarity and of an amplitude proportional to the AC output of the corresponding filter. The outputs of the detectors 86 and 89, in turn, are supplied to the non-inverting and inverting inputs 94 and 96 of a comparator 92, the output of which drives the coil of the relay 98 which, when energized, opens the normally closed contacts 98-*a* and 98-*b*. As shown in both FIGS. 1 and 2, the contacts 98-*a* selectively interrupt the flow of power from the power trunk station input port to output feeder lines, while the normally closed contacts 98-*b* interrupt power to the bridging amplifier.

When, as is the usual case, the incoming power to the FIG. 1 arrangement is at 60 Hz, the output of the active filter 71 will exceed that of the filter 70. Accordingly, the output of the detector 89 will exceed the output of the detector 86 such that a larger potential is supplied to the comparator 92 inverting input than to the non-inverting input. Accordingly, the output of the comparator is in its low voltage state such that the relay cycle is not energized, leaving the contacts 98-*a* and 98-*b* in their normally closed state such that full power distribution obtains.

However, when the incoming power is at 70 Hz (the power loss, stand-by condition), the outputs of the filter 70 and detector 86 exceeds those of the filter 71 and detector 89, respectively, such that the output of the comparator 92 attains its high voltage condition. The relay coil 98 is thus energized to open the contacts 98-*a* and 98-*b*, hence removing power from the feeder lines and bridging amplifier for the duration of the power interruption.

Hence, as above stated, in this standby power mode of operation, only trunk station main line amplifiers draw energy from the standby battery 62, thus providing an extended useful battery life, maintaining video throughout the composite trunk cable 10 for a relatively long period of time. When normal 60 cycle power is restored, the arrangement of FIG. 2 returns to its quiescent state above considered such that full video distribution again obtains.

The above described arrangement is merely illustrative of the principles of the present invention. Numerous modifications and adaptations thereof will become readily apparent to those skilled in the art without departing from the spirit and scope of the present invention. For example, the specific implementations of the filters 70 and 71 shown in FIG. 2 may be replaced by other filter configurations, both active and passive, well known to those skilled in the art. Moreover, the frequency sensing circuit 36 may simply comprise tuned means for detecting either one of the frequencies 60 Hz or 70 Hz; a threshold circuit to assure detection; and an inverter, if required, for relay control.

What is claimed is:

1. In combination in a cable video distribution system, at least one power source means connected to the cable, said power source means including means for quiescently supplying line voltage of standard frequency to said cable, a storage battery, means connected to said battery for generating a standby alternating current potential at a standby power frequency different than said standard frequency, switching means for connecting a selected one of said line voltage or said standby potential to system cabling, and power loss detector means responsive to a loss of line voltage for signalling said switching means to connect the output of said standby potential supplying means to the cable system, further comprising at least one trunk repeater station connected to the cable system, said trunk station comprising a main line amplifier for locally regenerating the video signal on the cable system, a power supply for energizing said main amplifier, a feeder line output port, a power receiving input port, controlled switching means normally connecting said power input port and said feeder line output port, and frequency sensing means responsive to power received by said trunk station at the standby rate for signalling said switching means to operatively disconnect said power input port and said feeder line output port.

2. A combination as in claim 1, wherein said frequency sensing means comprises first and second filter means respectively tuned to said standard and standby voltage frequencies, a comparator, and first and second signal amplitude detector means connecting the outputs of said first and second filters with inputs of said comparator.

3. A combination as in claim 1, wherein said trunk station further comprises a bridging amplifier quiescently powered by said power supply, and wherein said switching means includes means for selectively interrupting the energy flow from said power supply to said bridging amplifier.

4. A combination as in claim 2, wherein said filters comprise active filters.

5. In combination in a CATV composite line amplifier adapted to amplify video information on a trunk cable connected thereto, said amplifier quiescently receiving AC power via the cable at the standard frequency, and receiving power at a standby frequency distinct from the standard frequency when line power is disabled, said line amplifier comprising a main amplifier for locally regenerating the video signal on the trunk cable, a power supply for energizing said main amplifier, a feeder line output port, a power receiving input port, controlled switching means normally connecting said power input port and said feeder line output port, and frequency sensing means responsive to power received by said composite line amplifier at the standby rate for signalling said switching means to operatively disconnect said power input port and said feeder line output port.

6. A combination as in claim 5, wherein said composite line amplifier further comprises a bridging amplifier quiescently powered by said power supply, and wherein said switching means includes means for selectively interrupting the energy flow from said power supply to said bridging amplifier.

7. A combination as in claim 5, wherein said frequency sensing means comprises first and second filter means respectively tuned to said standard and standby voltage frequencies, a comparator, and first and second signal amplitude detector means connecting the outputs of said first and second filters with inputs of said comparator.

8. A combination as in claim 7, wherein said filters comprise active filters.

* * * * *